April 23, 1957 R. W. KERR 2,789,581
RESERVE PRESSURE CYLINDER
Filed Aug. 27, 1954
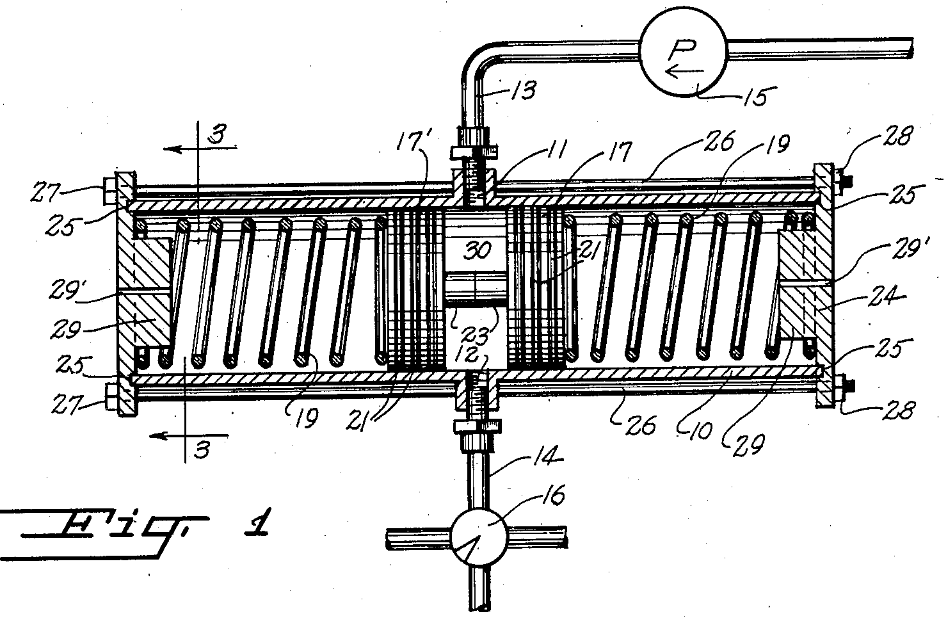
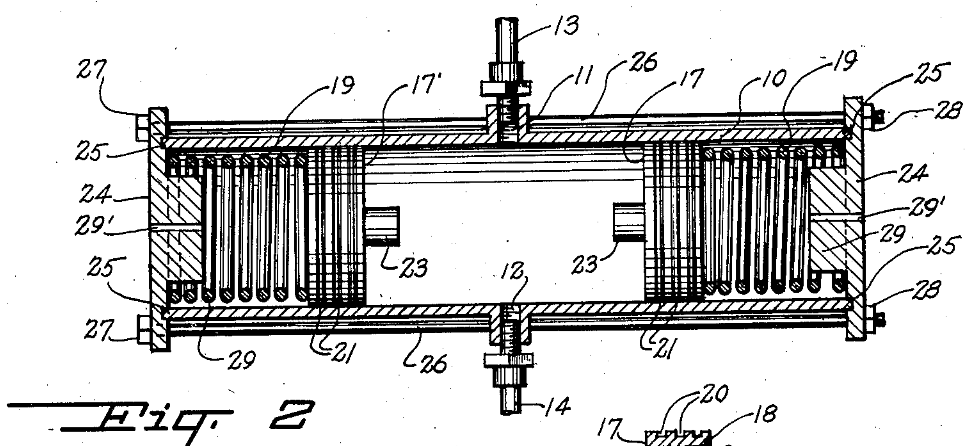
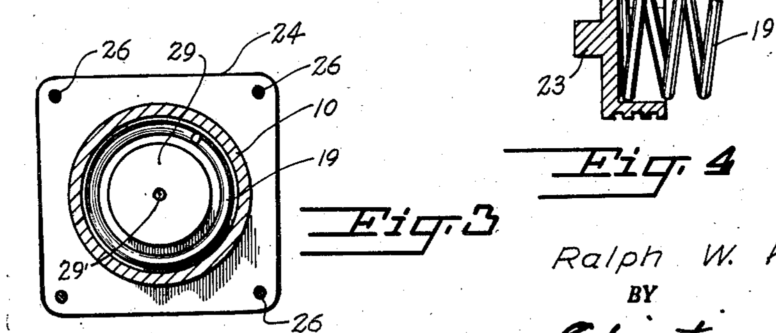
INVENTOR.
Ralph W. Kerr
BY
Christian R. Nielsen
Attorney United States Patent Office 2,789,581

Patented Apr. 23, 1957

2,789,581

RESERVE PRESSURE CYLINDER

Ralph W. Kerr, Bowman, N. Dak.

Application August 27, 1954, Serial No. 452,560

1 Claim. (Cl. 138—31)

This invention relates to hydraulic pressure systems and more particularly to a reserve pressure cylinder and it consists in the constructions, arrangements and combinations herein described and claimed.

It is the cardinal object of the invention to provide a reserve pressure cylinder which may be readily installed in the hydraulic system of tractors and other motorized mechanism, which will supply an additional volume of fluid pressure to the hydraulic cylinder or cylinders, when the tractor is operating under heavy loads or at slow speed.

More particularly, it is an object of the invention to provide a reserve pressure reservoir in the form of a cylinder having a pair of spring-urged pistons housed therein, each piston having an axial abutment maintaining the pistons in spaced apart relation forming a chamber for fluid through an inlet port and an outlet port formed in the cylinder between said pistons, the pistons being reciprocably movable in opposite directions to increase the storage space within the chamber for a reserve hydraulic pressure.

It is also an object of the invention to provide a reserve pressure cylinder which is of simple construction and readily installed in hydraulic systems of tractors and the like.

Additional objects, advantages and features of invention will be apparent from the following description considered in conjunction with the accompanying drawing, wherein Figure 1 is a longitudinal sectional view through the reserve pressure cylinder with the pistons in normal position.

Figure 2 is a similar view illustrating the position of the pistons when fluid enters the cylinder forming the reserve supply.

Figure 3 is a cross section on the line 3—3 of Figure 1.

Figure 4 is a longitudinal cross section through one of the pistons illustrating the mounting of the compression spring.

There is illustrated a hydraulic reserve pressure cylinder 10 which may be of any desired length and diameter depending upon the type of hydraulic system upon which it is employed.

Intermediate the length of the cylinder 10 an inlet port 11 is formed and diametrically opposite thereto an outlet port 12 is provided, these ports being interiorly threaded to receive fluid conducting pipes 13 and 14 respectively, the pipe 13 being connected with a hydraulic pump 15 of the system, while pipe 14 is connected to a selector valve 16 (see Figure 1).

The cylinder 10 is open at the ends for assembly of a pair of spring-urged pistons 17 and 17' which are of identical construction, one of which will now be described, attention being invited particularly to Figure 4 of the drawing. As shown the piston 17 has a hollow annular interior 18 forming a seat for a helical spring 19. The piston is formed with a plurality of grooves 20 for reception of seals 21, as shown in Figures 1 and 2.

The heads 22 of the pistons 17 and 17' are each provided with an axial abutment 23, for a purpose presently to be explained.

Closure heads 24 are provided for the ends of the cylinder 10 which are preferably of square formation as shown in Figure 3, the inner faces of which are formed with an annular groove 25 of a diameter to receive respective ends of the cylinder therein. The closure heads 24 are also provided with openings which when aligned, receive a tie rod 26 having a head 27 at one end and a nut 28 at the other end so as to draw the closure heads 24 into fluid-tight relation with respective ends of the cylinder 10. The inner face of the closure heads 24 are also provided with an annular concentric enlargement 29 forming a guide or seat for respective springs 19, and each includes an axial opening 29' forming a vent for air and fluid which may accumulate in the spring chambers.

The operation will be understood from the following description, reference being made to Figure 1, where the passage 30, the inlet port 11 and outlet port 12 of the cylinder are maintained in open communication, by virtue of the contacting engagement between the abutments 23 of the pistons, the latter being held in such position due to the tension of the springs 19. Fluid will be forced through the pipe 13 by the hydraulic pump 15 when the selector valve 16 is closed causing the pistons 17 and 17' to move toward respective ends of the cylinder 10 and compressing the springs 19. Thus, the space 30 is enlarged permitting storage of a large volume of fluid under pressure. When the pressure relief valve of the system opens the reserve fluid in the chamber is maintained for positive and dependable action upon hydraulic cylinders of the tractor, even though the tractor is running at slow speeds, it only being necessary to open the selector valve, the springs 19 urging the pistons toward each other and compressing the fluid therebetween so that the fluid under pressure, will be supplied to the required hydraulic cylinders of the tractor.

It will be understood that any suitable bracket (not shown) may be employed for mounting the reserve cylinder upon a tractor.

While I have shown and described a preferred form of the device, this is by way of illustration only, and I consider as my own all such modifications in construction as fairly fall within the scope of the appended claim.

I claim:

A reserve pressure cylinder for use in a hydraulic system of a tractor or the like comprising an open ended cylinder, a pair of spring-urged pistons arranged in opposed reciprocable position within said cylinder, the head of each piston having an axial abutment for contacting engagement for normally maintaining said pistons in spaced apart relation intermediate of the length of the cylinder forming a chamber, closure heads for the open ends of the cylinder, bolt and nut means for drawing said closure heads into sealed engagement with the ends of said cylinder, each closure head having an annular concentric enlargement forming a guide for the springs of said pistons, an inlet port in communication with the chamber, an outlet port in communication with said chamber and said concentric enlargements being formed with an axial vent opening.

References Cited in the file of this patent

UNITED STATES PATENTS

| | | |
|---|---|---|
| 912,502 | Squires | Feb. 16, 1909 |
| 2,137,384 | Browne | Nov. 22, 1938 |
| 2,170,890 | Allen | Aug. 29, 1939 |
| 2,365,994 | Ashton | Dec. 26, 1944 |
| 2,540,031 | Berger | Sept. 28, 1948 |

FOREIGN PATENTS

| | | |
|---|---|---|
| 87,187 | Germany | of 1896 |
| 110,377 | Germany | Aug. 10, 1928 |